United States Patent [19]

Failla et al.

[11] 4,028,177

[45] June 7, 1977

[54] PROVISION FOR COOLING THE TOP END OF A SUSPENDED VESSEL, SUCH AS THE PRESSURE VESSEL OF A NUCLEAR REACTOR

[75] Inventors: Henri Failla, Aix-en-Provence; Karl Schaller, Valen Sole; Michel Vidard, Aix-en-Provence, all of France

[73] Assignee: Commissariat A l'Energie Atomique, Paris, France

[22] Filed: Aug. 29, 1975

[21] Appl. No.: 609,166

[30] Foreign Application Priority Data

July 2, 1975 France .............................. 75.20820
Aug. 30, 1974 France .............................. 74.29648

[52] U.S. Cl. .................................. 176/38; 176/65; 176/87; 176/DIG. 2
[51] Int. Cl.² ........................................ G21C 15/00
[58] Field of Search ................. 176/37, 38, 60, 65, 176/87, DIG. 2

[56] References Cited

UNITED STATES PATENTS

| | | | |
|---|---|---|---|
| 2,995,505 | 8/1961 | Guild .............................. | 176/87 X |
| 3,129,836 | 4/1964 | Frevel .............................. | 176/87 X |
| 3,362,567 | 1/1968 | Rudock .......................... | 176/87 X |
| 3,398,493 | 8/1968 | Massey ........................... | 176/87 X |
| 3,489,206 | 1/1970 | Lecourt .......................... | 176/87 X |
| 3,680,627 | 8/1972 | Linning .......................... | 176/65 X |
| 3,830,695 | 8/1974 | Sauvage ......................... | 176/38 |
| 3,864,210 | 2/1975 | Hanisch .......................... | 176/87 X |

FOREIGN PATENTS OR APPLICATIONS

| | | | |
|---|---|---|---|
| 2,133,410 | 1/1972 | Germany ......................... | 176/65 |
| 1,195,819 | 6/1970 | United Kingdom ................ | 176/38 |

*Primary Examiner*—Peter A. Nelson
*Attorney, Agent, or Firm*—Cameron, Kerkam, Sutton, Stowell & Stowell

[57] ABSTRACT

This invention relates to means for cooling the top end of a suspended vessel such as the pressure vessel of a nuclear reactor.

The invention consists in supplying a liquid coolant which flows through coils located in contact with an intermediate heat conducting material which is in contact with the top end of the vessel. The liquid coolant or the intermediate liquid may be of liquid metal such as a sodium-potassium alloy and the intermdiate material may be contained in a tank rigidly secured to the vessel.

In modified arrangements the intermediate material may be a solid or a gas.

10 Claims, 6 Drawing Figures

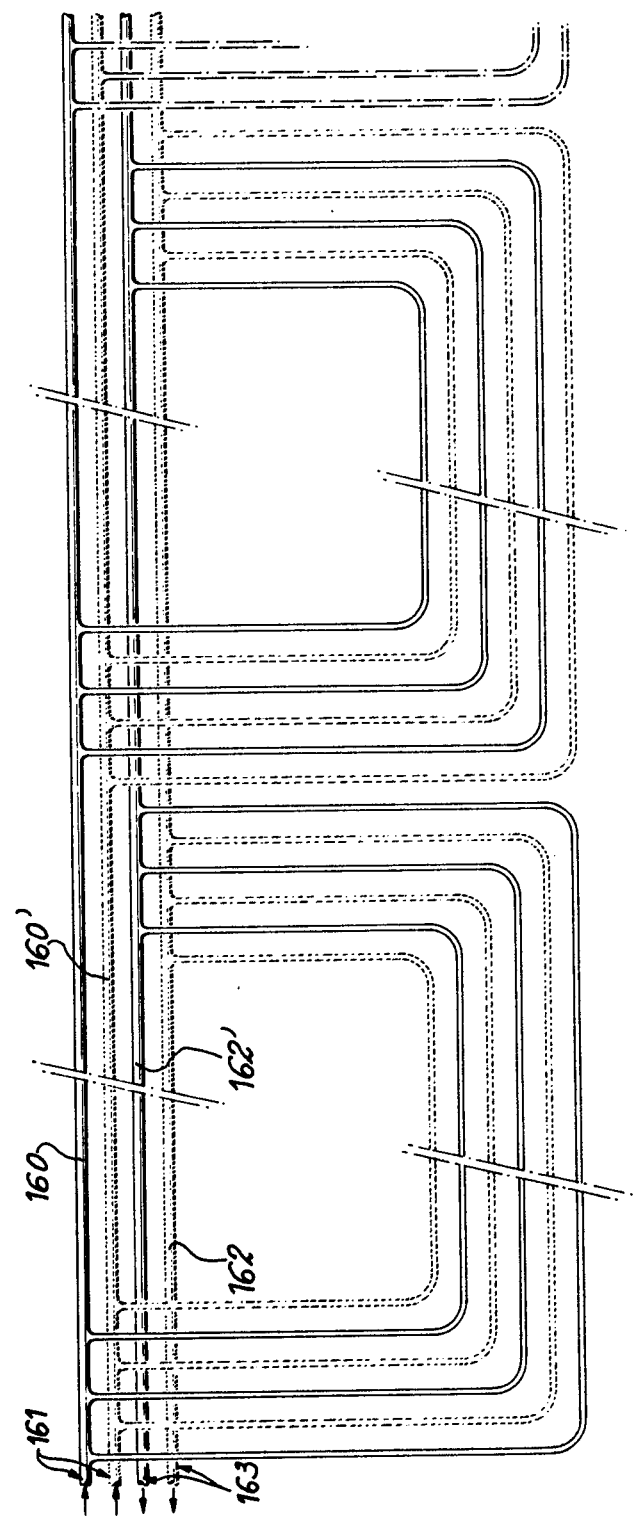

PROVISION FOR COOLING THE TOP END OF A SUSPENDED VESSEL, SUCH AS THE PRESSURE VESSEL OF A NUCLEAR REACTOR

This invention relates to provision for cooling the top end of a suspended vessel, such as the pressure vessel of a nuclear reactor, for example, the main pressure vessel of the liquid metal cooled fast neutron reactor.

In a sodium cooled fast neutron reactor, the primary sodium which cools the core is contained in a vessel called the main vessel. The same usually has around it a second or safety vessel, of use more particularly for recovering possible sodium leaks from the main vessel. Disposed above the two vessels is a top closure slab which provides biological shielding and which carries all the items required to dip into the sodium, more particularly the primary pumps and the intermediate exchangers in the case of an integrated reactor, and the handling facilities, more particularly the rotating plugs.

The main vessel, its contents and the safety vessel must be supported and they must be hermetic in respect of the environmental atmospheres. One known means of achieving such a state of affairs is to suspend the main vessel on the top closure slab by welding the plenum chamber to the slab, the safety vessel then being connected to the slab in exactly the same way. The top slab then acts as a roof for the main vessel. The slab can be heat insulated, to prevent it from being heated by the sodium, and is kept cool by internal cooling circuits.

Near the exposed level of sodium the temperature of the main vessel is near the temperature of the cold sodium in contact with the vessel and is therefore high. At the place where the vessel is connected to the slab, the vessel temperature is near the average slab temperature which is relatively low, since the cooling circuits keep the slab at a temperature near the ambient temperature. Between these two levels, therefore, there is a temperature gradient which may be considerable, possibly as much as 400° C per meter run in the connection zone.

A temperature distribution pattern of this nature arises during transient reactor operating conditions. The temperature distribution must be such that the mechanical behaviour of the suspension remains satisfactory; more particularly, the temperature gradient in the region where the top part is embedded must be reduced. The vessel connection is cooled only by heat exchange with the cool walls of the slab and of the safety vessel but is heated as a result of the gas thermosiphons which receive their heat in the hot argon of the top of reactor in the case of the internal thermosiphon and in the hot nitrogen forming the atmosphere between the main and safety vessels in the case of the external thermosiphon.

It is an object of this invention to provide a temperature distribution which is optimal in the light of the mechanical behaviour of the top part of the vessel suspension. The invention accordingly has provision for cooling the top end of the vessel, characterized in that it comprises coils flowed through by a liquid coolant and immersed in an intermediate heat-conductive material in contact with the vessel top end.

The intermediate material can be a liquid or a solid or a gas.

Advantageously, the intermediate material, if a liquid, is a liquid metal, e.g. a sodium-potassium alloy.

As appropriate solids there may be mentioned thermal concrete or metals such as aluminium or copper or their alloys. The metals can be used either in monolithic form or in divided form, e.g. as balls.

As gas there can be used e.g. helium or nitrogen.

The liquid used as coolant and flowing through the coils can be any liquid, e.g. a liquid metal including an alloy of sodium and potassium.

The invention will now be described by way of example with reference to the accompanying drawings wherein:

FIG. 6 shows an embodiment of the cooling coils.

Figure 1:
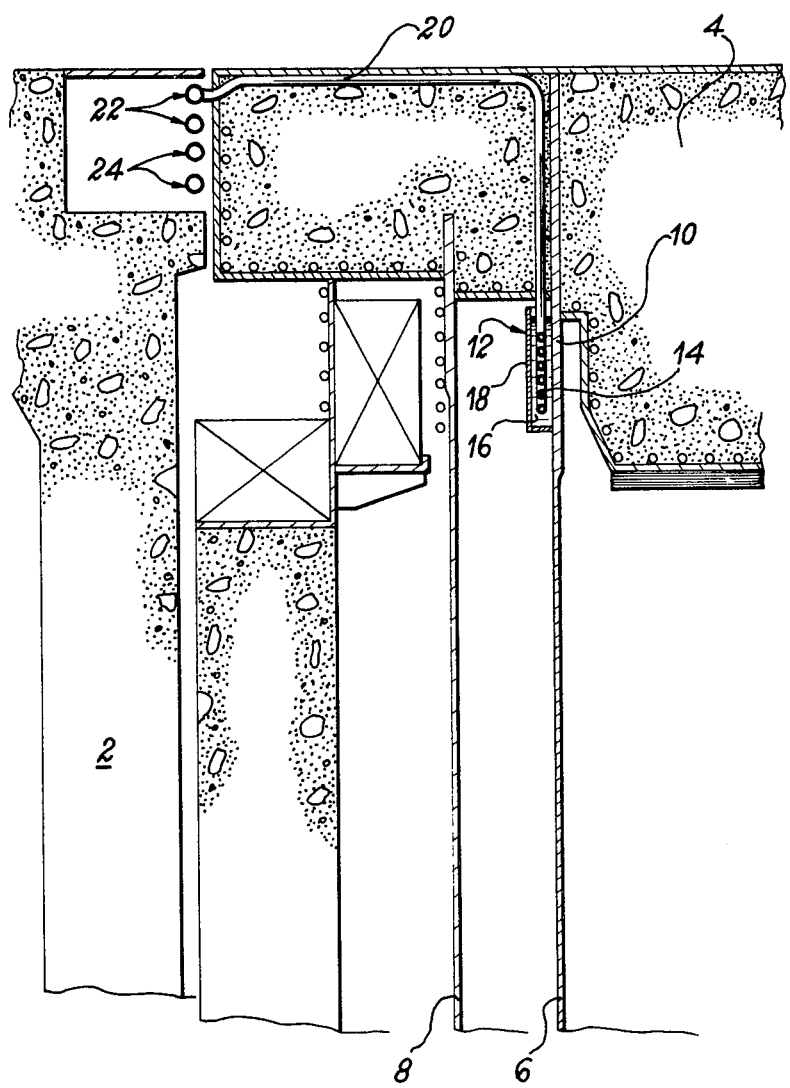
FIG. 1 is a diagrammatic sectioned view of the top part of the vessels of a fast neutron nuclear reactor.

FIG. 1 is a sectioned view of the top part of the vessels of a fast neutron reactor. There can be seen a concreted pressure vessel 2 closed by a top slab 4 on which a main vessel 6 and a safety vessel 8 are suspended.

The top wall 10 of the main vessel 6 is cooled by a system 12 comprising coils 14 flowed through by a liquid coolant and immersed in an intermediate material 16 in contact with wall 10, the material 16 being received in a tank or the like 18 rigidly secured to wall 10. Liquid coolant flows through the coil in pipes 20 between inlets 22 and outlets 24.

Figure 2:
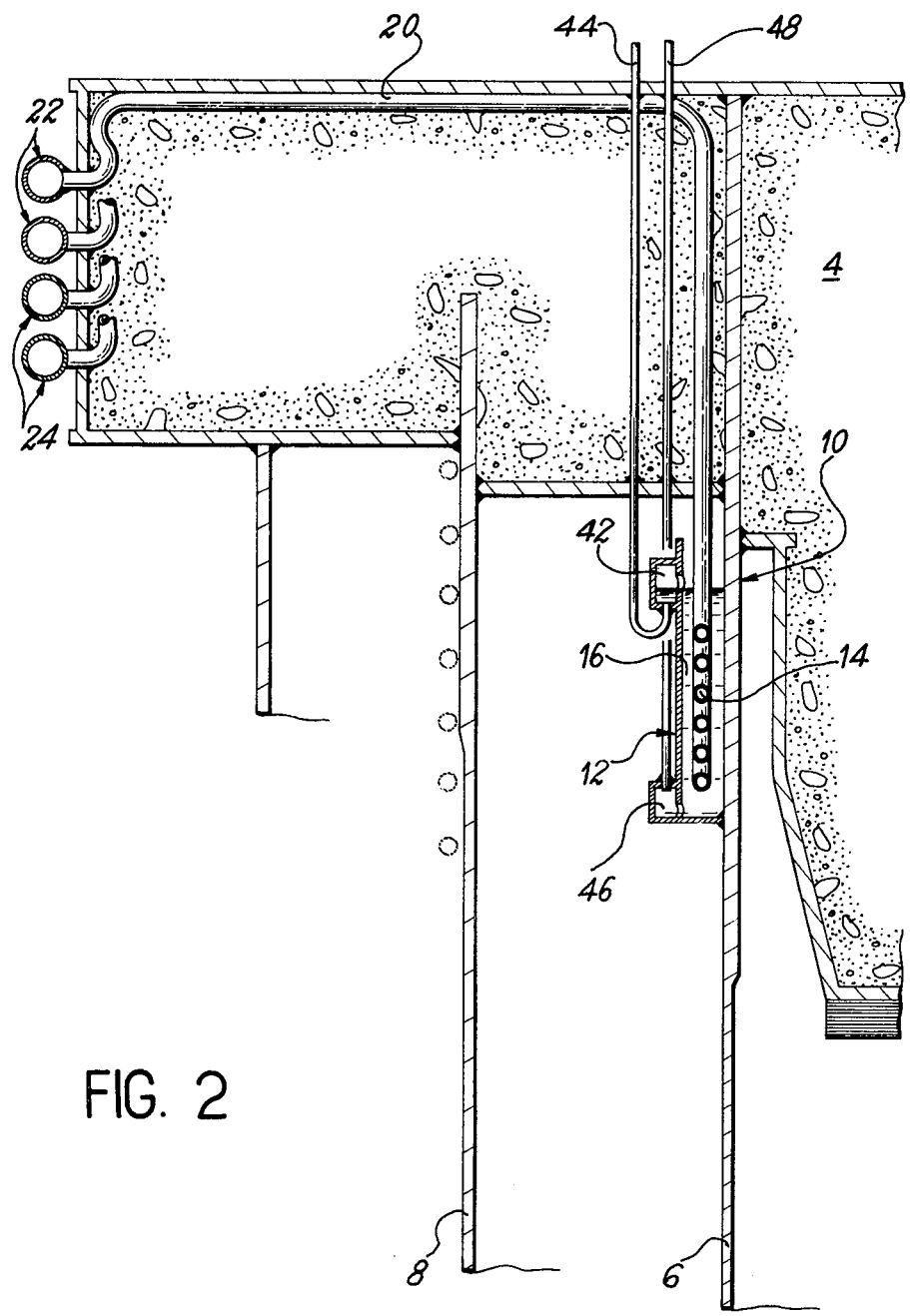
FIG. 2 shows the provisions according to the invention for cooling the top part of the main vessel in a first embodiment, the intermediate material being a liquid.

FIG. 2 is a more detailed view of the cooling system 12, the intermediate material being a liquid. To simplify matters like elements in FIGS. 1 and 2 have the same references. The cooling circuit 12 has coils 14 which are not secured to the vessel wall but which provide cooling by way of the liquid 16 in which the pipe coils 14 are immersed. Advantageously, a sodium-potassium alloy which is liquid at ambient temperature is used for the liquid coolant and for the intermediate material or liquid. The cooling system also comprises an overflow 42 and an overflow suction line 44, and a drain tube 46 associated with a suction tube 48.

Figure 3:
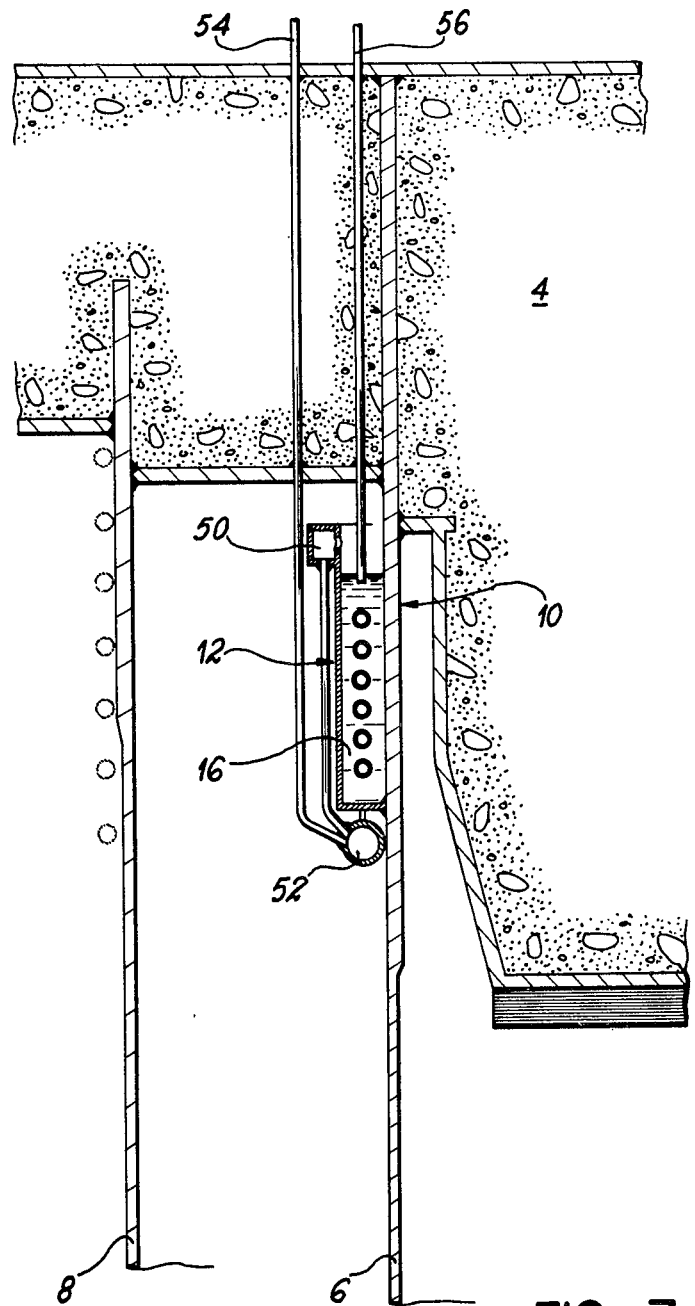
FIG. 3 shows a second embodiment using a liquid.

The cooling facility shown in FIG. 3 differs from the system shown in FIG. 2, mainly because it comprises an overflow 50 and an overflow reservoir 52 associated with an overflow suction line 54. The intermediate liquid metal 16 can be supplied via a line 56.

Figure 4:
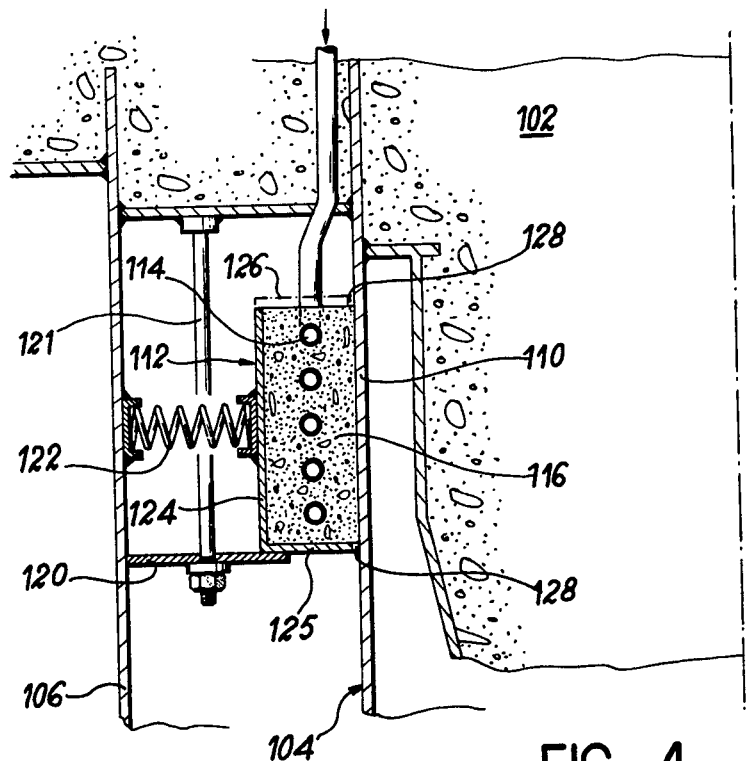
FIG. 4 shows another embodiment in which the intermediate material is a solid.
Figure 5:
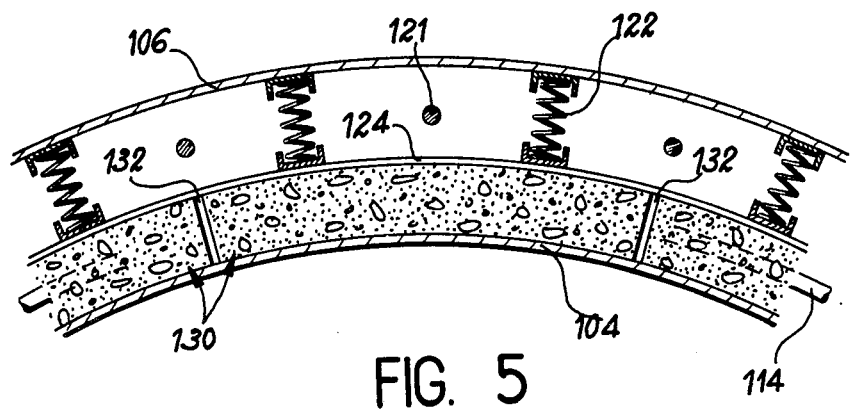
FIG. 5 shows a variant in which the solid intermediate material is distributed in the form of segments around the vessel to be cooled.

In another variant, and as is shown in FIGS. 4 and 5, the intermediate material between the coils and the vessel to be cooled can be a solid or gas.

FIG. 4 is a view in axial section of the top part of the vessels of a fast neutron nuclear reactor. A main vessel 104 and a safety vessel 106 are suspended on a top slab 102. Main vessel top wall 110 is cooled by a system 112 comprising coils 114 flowed through by a liquid coolant, the coils 114 being in contact with an intermediate material 116 which in the variant shown is a solid. The intermediate material 116 is in contact with wall 110 by way of any mechanical system which can engage the material 116 with wall 110 in a manner providing appropriate heat contact. By way of explanation and without limitation such means can take the form of a support 120 carrying a bearing end member 125, the periphery of the material 116 having a pressure applied to it by a rod or the like 121 and means 122.

The intermediate material 116 can be made of thermal concrete or of metals such as aluminium or copper or their alloys. The metals can be used either in monolithic form or in divided form, for instance, in the form of balls.

The advantage of using a solid material, such as thermal concrete, instead of the intermediate liquid of the first variant is the obviation of any welding to the main vessel, for the tank or container or the like does not then have to be completely sealing-tight, a feature which greatly simplifies construction.

Any mechanical system enabling the body of material to be applied to the vessel are adequate in such a case.

If the intermediate material used is a solid, such as concrete or a metal in monolithic form, such material is preferably arranged in the form of segments so that it cannot be cracked by differential expansions caused by temperature differences. The segmental feature is shown in FIG. 5, which is a cross-section through the system according to the invention. In FIG. 5 segments 130 are spaced apart from one another by an appropriate gap 132 of e.g. from 1 to a few millimeters. The length of the segments can be up to 25% of the circumference of the main vessel.

In another variant the intermediate material or agent or the like can be a gas, e.g. helium or nitrogen. The gas, if used, is received in a receiver which has the reference 124 in FIG. 4 and which has a top partition 126 and sealing means 128.

In the case of a segmented structure as in the variant of FIG. 5, sealing-tightness between the tanks and the vessel can be provided by sealing means placed on the surface of the tanks and in contact with the vessel; such sealing means can be inflatable, for example by means of the gas used in the tank or container or the like.

FIG. 6 shows an embodiment of the pipe coils, for the special case in which the liquid coolant flow system comprises two feed lines 160, $160^1$ connected to inlets 161 and two outlet lines 162, $162^1$ connected to outlets 163.

We claim:

1. Means for cooling the top end of a pressure vessel of a nuclear reactor, suspended from a cover and containing a primary liquid at a first temperature, comprising coils receiving a flow of a second liquid coolant at a temperature lower than that of the primary liquid, the coils being out of contact with the primary liquid and in contact with an intermediate heat-conducting material isolated from the primary liquid and in contact with the top end of the vessel.

2. Means according to claim 1, the intermediate material being a liquid in a tank rigidly secured to the vessel.

3. Means according to claim 2, at least one of the liquid coolant and the intermediate liquid being a liquid metal.

4. Means according to claim 3, the second liquid coolant and the primary liquid each being a sodium-potassium alloy.

5. Means according to claim 1, the intermediate material being a solid.

6. Means according to claim 5, the solid being selected from the group consisting of a thermal concrete, aluminium, copper, an aluminium alloy and a copper alloy.

7. Means according to claim 1, the intermediate material being a gas.

8. Means according to claim 7, the gas being selected from the group consisting of helium and nitrogen.

9. Means according to claim 1, the intermediate material being juxtaposed segments disposed around the vessel.

10. Means according to claim 1, said coils being outside of said vessel, said intermediate material being in contact with an external surface of said vessel.

* * * * *